United States Patent [19]

Ohno

[11] Patent Number: 4,600,273

[45] Date of Patent: Jul. 15, 1986

[54] DISPLAY PANEL HAVING CONDUCTIVE CONTACT MEDIA

[75] Inventor: Yoshihiro Ohno, Suwa, Japan

[73] Assignee: Seiko Epson Corporation, Tokyo, Japan

[21] Appl. No.: 486,608

[22] Filed: Apr. 19, 1983

[30] Foreign Application Priority Data

Apr. 20, 1982 [JP] Japan .................................. 57-65698

[51] Int. Cl.⁴ ................................................ G02F 1/13
[52] U.S. Cl. ..................................... 350/336; 350/343; 350/344
[58] Field of Search ........................ 350/336, 344, 343

[56] References Cited

U.S. PATENT DOCUMENTS 4,308,533 12/1981 Schmidt .................... 350/343 X
4,362,771 12/1982 Umeda et al. .................. 350/344 X

FOREIGN PATENT DOCUMENTS 2602183 3/1977 Fed. Rep. of Germany ...... 350/344
2034095 5/1980 United Kingdom ................ 350/344

Primary Examiner—John K. Corbin
Assistant Examiner—Richard F. Gallivan
Attorney, Agent, or Firm—Blum Kaplan Friedman Silberman and Beran

[57] ABSTRACT

A liquid crystal display panel comprising opposed substrates, electrodes on the inside opposed surfaces of said substrates and arranged opposite to each other to sandwich a display layer, a contact media for electrically connecting an electrode on one substrate with an electrode on the other substrate and disposed between said electrodes of said substrates, and a binder between said substrates and fixably engaging said contact media with said electrodes, the diameter of said contact media selected to be substantially the same as the thickness of a liquid crystal cell layer. The contact media comprises a non-conductive core electroless plated with a conducting metal.

15 Claims, 8 Drawing Figures

FIG. 7
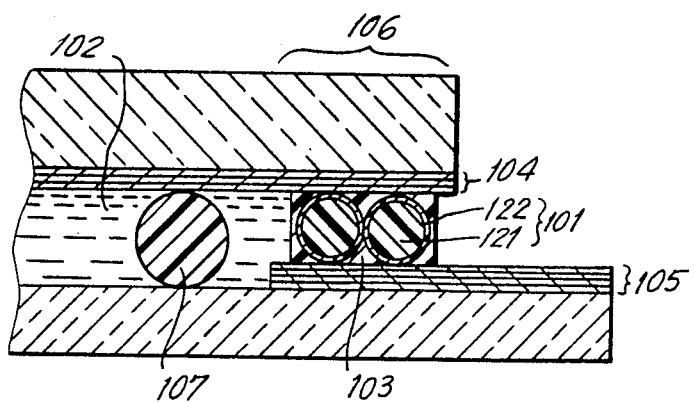
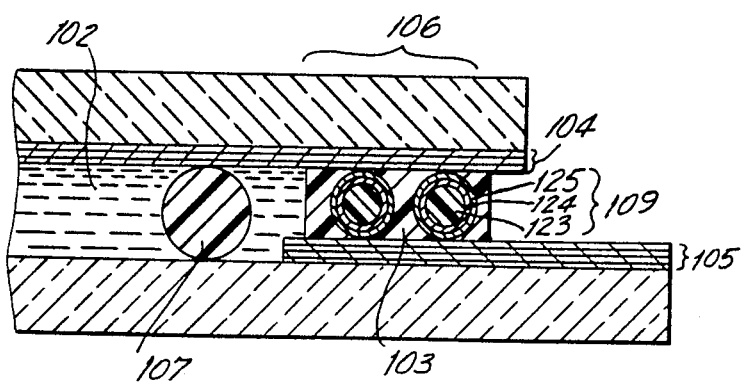
FIG. 8

DISPLAY PANEL HAVING CONDUCTIVE CONTACT MEDIA

BACKGROUND OF THE INVENTION

This invention relates to a display panel having conductive contact media disposed between upper and lower electrodes which function as the gap material between the electrodes and more particularly to a liquid crystal display panel having improved electrical contacts between the upper and lower electrodes, and improved display quality, speed and color.

Conventional liquid crystal display panels have a spacing, or gap, between upper and lower electrode bearing substrates. A common electrode, generally of a metal, is in electrical contact with the electrodes of each substrate. In general, a soft metal, e.g. indium, is utilized as the electrical connection between the upper and lower substrates. In order to provide this connection, the soft metal is placed into a gap created in one substrate and then the two substrates are forced into parallel, opposed alignment, spaced apart by the soft metal. One disadvantage of this structure and method is the tendency toward contact failure between the soft metal and the electrodes. To overcome this defect resinous adhesive agent including a conductive metal, e.g. silver, has been printed on either the upper or lower substrate prior to construction of the panel. This resinous agent is generally applied in the form of a paste. However, unacceptably high proportions of electrical contact failure between the upper and lower electrodes when using such pastes are known. These failures occur during the necessary steps undertaken in the process of manufacturing a liquid crystal panel. To manufacture a panel, a matrix of panel substrates is formed on a master substrate and then each panel substrate is separated by mechanical means. In a conventional construction, a conductive resinous adhesive silver paste is positioned on each individual substrate panel prior to the separation step. When the force necessary to separate each individual panel is applied, the silver paste in the adhesive material tends to disassociate itself therefrom. As a result, when the individual substrates are brought into opposition, contact failure sometimes occurs between the upper and lower substrates. The contact failure can be adhesive or electrical in nature. When the adhesive resin content of the silver paste is increased, it becomes difficult to maintain the silver particles in electrical contact with each other. This results in unacceptable levels of contact failure between the upper and lower electrodes. Conversely, if the concentration of the silver particles in the silver paste is increased to overcome this drawback, the adhesive properties of the paste are diminished, thereby also causing unacceptable rates of contact failure. Optimum ratios of resins and silver particles, even when mixed properly, do not exist, since variations in conditions such as humidity and temperature of manufacture, as well as drying temperature, all cause variations in the properties of the silver paste product. Furthermore, the average particle diameter of the silver particles in the silver paste varies. It is generally more than about seven microns, although particles smaller than this size do regularly appear. Additionally, the shape of the particles also varies. Thus, two particles can be generally of the same size, but differ enough in shape to effect the alignment of the opposed display panels. This variation in particle sizes and shapes causes great difficulty in aligning in parallel the opposed substrate plates.

SUMMARY OF THE INVENTION

The disadvantages of the art can be overcome by providing a contact media which generally comprises a non-conductive core material disposed between the upper and lower electrodes of the display panel. The core material is made conductive by electroless plating thereon of one or more conductive materials. The diameter of the coated core materials is selected to be almost the same as, or slightly larger than, the gap between the upper and lower liquid crystal panel electrodes of the display. The non-conductive core particles, such as glass beads, glass fibers, or plastic balls, can be formed by injection-molding or by cooling after they are melted and passed through an orifice, having a fixed diameter. It is, therefore, possible to mass-produce particles having a uniform diameter. As a result, cell thickness can be made uniform and the cost of manufacture can be reduced.

In accordance with the invention, a conductive contact media is disposed between the upper and lower electrodes to provide electrical contact and consistent spacing between the electrodes on the upper and lower panels. The media has a relatively uniform, predetermined thickness. The contact media acts as a gap material, providing uniformity to the thickness of the display cell. It also imparts effective, reliable electrical contact between the upper and lower electrodes. The contact media includes a non-conductive core material, such as glass fiber, glass beads, inorganic glass beads or plastic fiber or beads. These core materials are electroless plated with a conductive metal. The contact media also includes alumina fiber and beads. They are then disposed in a resinous adhesive material. The material is sandwiched between the electrodes on the upper and lower substrate panels.

The adhesive containing the metallized cores (contact media) is placed on the contact portion between the upper and lower electrodes of the liquid crystal panel by printing or dropping onto an electrode before it is incorporated into the liquid crystal panel Generally, glass is utilized as the substrate of the liquid crystal panel. However, it is possible to use a plastic film wherein a transparent electrode ($SnO_2$, $In_2O_3$, etc.) is patterned. When using plastic film, the contact portion of the contact media between the upper and lower electrodes is depressed by pressure when the liquid crystal panel is assembled. The contact area of the electrodes with the contact media between upper and lower electrodes increases, which results in increased adhesion.

When the non-conductive core comprises a relatively hard material, such as glass fibers, glass beads or hard plastic fibers or beads, its diameter should be about that of the cell thickness. When the core comprises a soft plastic its diameter should be no more than about 1.0 to about 1.3 times the thickness of the cell.

Accordingly, it is an object of the invention to provide an improved liquid crystal panel.

Another object of the invention is to provide an improved contact media between the upper and lower electrodes of a liquid crystal panel.

A further object of the invention is to provide contact media between the upper and lower electrodes which are made conductive by providing a non-conductive core and thereupon electroless plating to the core a conductive material, while providing predetermined diameters for the core material to enable the conductive contact media between the upper and lower electrode of the liquid crystal panel to have a relatively uniform thickness.

Yet another object of the invention is to provide a conductive contact media which also functions as a gap material for the cell.

Still other objects and advantages of the invention will in part be obvious and will in part be apparent from the specification.

The invention accordingly comprises an article of manufacture possessing the features, properties and relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 7 is a sectional view of a display panel including a liquid crystal display area and an electrical contact area in accordance with the invention; and FIG. 8 is a sectional view of a display panel including a liquid crystal display area and an electrical contact area according to an alternate embodiment of the invention.

DESCRIPTION OF THE PREFERRED EMBODIMENTS

Figure 1:
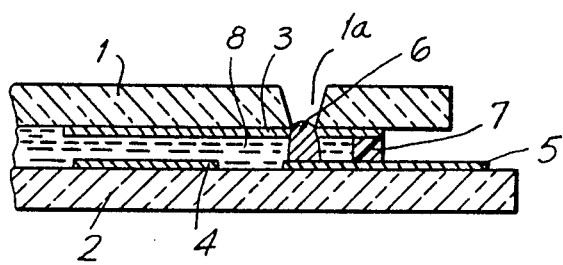
FIG. 1 is a sectional view of a conventional display panel incorporating a soft metal contact between a common electrode and a lead terminal.

FIG. 1 is a sectional view of a conventional liquid crystal display panel having a soft metal contact between the upper and lower substrates. A soft metal, such as indium 6, is utilized to conductively connect upper substrate 1 and lower substrate 2 through common electrode 3 and lead terminal 5. The soft metal 6 is positioned by first locating an aperture 1a in the upper substrate 1. Soft metal contact 6 is inserted through the aperture 1a. Substrates 1 and 2 are compressed toward each other so that common electrode 3 is conductively connected to lead terminal 5 by soft metal 6. A gap spacing material 7, is disposed between the upper and lower substrates to help position them in a parallel spaced apart relation. Liquid crystal 8 is disposed generally between the upper substrate 1 and lower substrate 2.

Figure 2:
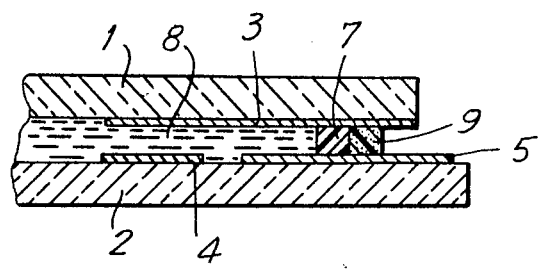
FIG. 2 is a sectional view of a conventional display panel including a silver paste contact media.

FIG. 2 discloses another conventional embodiment of a liquid crystal display panel. A resinous silver paste 9 is employed as the electrical contact media between the common electrode 3 and lead terminal 5. In this embodiment, there is no need for soft metal contact 6, or for an aperture 1a in substrate 1. Gap material 7 is disposed between upper substrate 1 and lower substrate 2.

Figure 3:
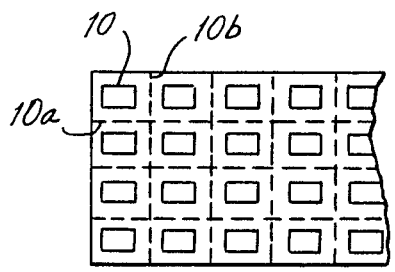
FIG. 3 is a plan view of a matrix comprising rows and columns of display panel substrates.

FIG. 3 discloses a matrix of liquid crystal display panels 10 in contiguous relationship. Each panel 10 is defined by rows 10a and columns 10b of scorelines. The respective panels 10 will be separated from each other, when appropriate force is applied at the score lines.

Figure 4:
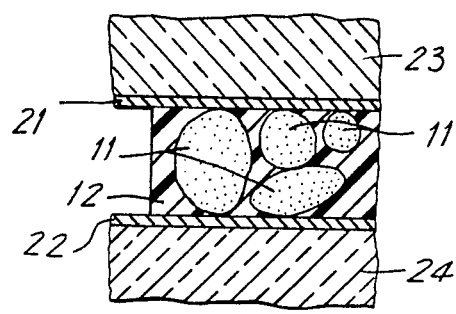
FIG. 4 is a sectional view of a portion of a display panel using silver paste as the electrically conductive connective media.

FIG. 4 is a sectional view of the conductive portion of a conventional display panel which uses a silver paste including silver particles 11, in an adhesive resin 12. The respective silver particles 11 are not uniform in size or shape. This lack of uniformity prevents the respective electrodes 21, 22 and substrate panels 23 and 24 from being properly aligned in parallel.

Figure 5:
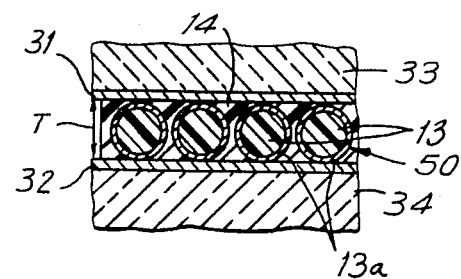
FIG. 5 is a sectional view of a portion of an electrical contact area of a display panel using an electroless plated hard core according to the invention.

With reference to FIG. 5, glass fiber core 13 is electroless plated with electrically conductive metal 13a to form a metallized glass fiber 50. Metallized fibers 50 are disposed in adhesive matrix 14. Matrix 14 acts as a binder between the metallized glass fibers 50 and electrodes 31 and 32 on substrates 33 and 34.

If an elastic or soft core is to be used, e.g. a plastic bead or fiber, it is generally necessary to utilize a core having a diameter between 1 and 1.3 times as large as the thickness T of the gap between the upper and lower electrodes of the liquid crystal panels.

The core to be electroless plated should be prepared for plating as follows. The surface should undergo alkali-degreasing and then acid-neutralizing. Thereafter, the core should be sensitized in a SnCl$_2$ solution in order to absorb Sn$^{2+}$ ions onto its surface. The sensitized core material should then be subjected to an activation step. This activation is undertaken by contacting the sensitized core with a PdCl$_2$ solution to cause Pd$^0$ to be present during electroless plating according to the following formula.

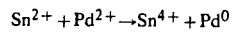

$$Sn^{2+} + Pd^{2+} \rightarrow Sn^{4+} + Pd^0$$

The Pd will act as a catalyst on the surface of the core for electroless plating.

An electroless plating bath consists of a plating bath using at least one of the metals selected from the group consisting of gold, nickel, copper, silver, cobalt and tin. The metal having the best adhesive strength of this group is nickel, and accordingly an electroless nickel bath is most suitable for coating the core material. The actual electroless plating steps are undertaken in a hot electroless plating bath, according to well-known steps.

A layer of 200 Å to 5000 Å thickness is preferable for metallizing the core material of the liquid crystal panel. If the plating layer is under 200 Å thick, it is of no practical use since the non-plated portion comes out on the core material and the resistance increases. If the plating layer is over 5000 Å thick, the distance between the contact portions at the upper and lower electrodes and the thickness of the gap of liquid crystal panel can become more than 1 μm. When this occurs the liquid crystal layer becomes irregular and its color is non-uniform, as a result of unevenness and the interference with light.

A plating 200 Å to 4 μm thick is preferable for metallizing a plastic ball or plastic fiber. If the plating is under 200 Å in thickness, it is of no practical use for the same reason as the case of the gap material. If the plating layer is over 4 μm thickness, the metal layer is too easily cracked when constructing the liquid crystal panel. This causes contact failure. It also becomes difficult to control the gap thickness of the liquid crystal panel when plating layer is over 4 μm thick.

If the resistance value is unacceptable when an electroless layer, such as a nickel, is deposited on the core material, a layer of precious metal having excellent electrical conductivity properties, such as silver or gold, can be electroless plated on the surface of the nickel. The layer of precious-metal plating is preferably between 50 Å and 1 μm thickness.

The plated core material is added to the adhesive agent and dispersed uniformly therein prior to application to the substrate. Suitable compositions for the adhesive agent are epoxy resin, silicon resin, phenol resin, vinyl acetate resin, urea resin, vinyl chloride resin, resorcinol resin, acrylic resin, or other like synthetic resins.

The amount of the metalized insulating material in the adhesive agent is preferably in the range of 0.1 wt.% to 50 wt%. If this amount is less than 0.1 wt%, resistance is too easily increased or uncontrollably varied. If the amount is more than 50 wt%, the adhesion properties are decreased. The metallized core materials are preferably dispersed in the adhesive agent in plural, preferably in the range of 5 pieces to 500 pieces on one conductive, contact portion between the upper and lower electrodes of the liquid crystal panel. Amounts not in this range are generally unsuitable since conductivity and adhesion cannot be properly controlled. The acceptable range will vary somewhat according to the diameter of the conducting material.

Figure 6:
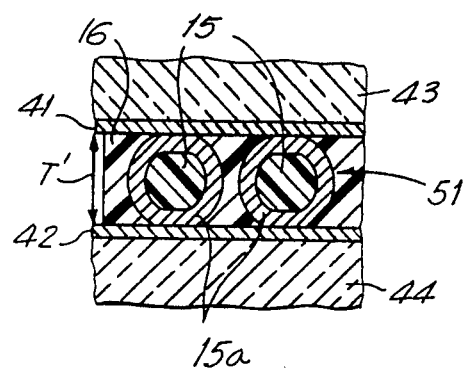
FIG. 6 is a sectional view of an electrical contact area of a display panel using an electroless plated soft core according to an alternate embodiment of the invention.

FIG. 6 illustrates an embodiment of the invention including an elastic core 15, such as a plastic ball or a plastic fiber. Core 15 has a diameter larger than the thickness $T^1$ of the liquid crystal and is electroless plated with electrically conductive metal 15a to form metallized core 51. The metallized core 51 can be elastically deformed if the thickness of the display panel varies. Thus, when the diameter of core 15 is greater than that of the gap $T^1$, the metallic surfaces 15a firmly contact the upper and lower electrodes 41 and 42 on substrates 43 and 44.

If the diameter of elastic core 15 is greater than about 1.3 times as large as the thickness of the liquid crystal $T^1$ the core will be substantially compressed upon construction of the display panel. This compression can cause a stress fracture of metal layer 15a, resulting in electrical contact failure. Therefore, the preferred range of diameters for an elastic core 15 to be electroless plated with metal conductor is from about 1.1 to about 1.3 times as large as the thickness of the liquid crystal.

EXAMPLE 1

Glass fiber particles 5 μm in diameter were dipped in a 10N solution of sodium hydroxide for 5 minutes, filtered, neutralized after being rinsed, and filtered again. When filtering these particles, a micro filter with a diameter of 1 μm is preferably used. The particles were then dispersed in a mixed solution of 1 g/lit. of $SnCl_2$ and 1 cc/lit. HCl, filtered, rinsed and further dispersed in a water solution 0.5 g/lit. $PdCl_2$, 1 cc/lit. 37% HCl and stabilizer, (RED SUMER solution of JAPAN KANIGEN Co., Ltd.), which was prepared according to known processes, filtered and rinsed again. Then, the glass fiber particles were dispersed for 6 minutes in a mixed solution of 20 g/lit. $NiSO_4$; 25 g/lit. $NaH_2PO_2$; 30 g/liter of complexing agent of sodium malate, sodium acetate and sodium citrate and 15 g/lit. $(NH_4)_2SO_4$ buffing agent, (S-680 solution of JAPAN KANIGEN Co., Ltd.), at 45° C., which was prepared according to known processes, filtered and then rinsed. Electroless nickel-phosphorous plating formed a conductive layer 3500 Å thick on the glass fiber. The glass fiber particles with the electroless nickel-phosphorous plating layer were then dispersed in an epoxy resin in an amount of about 25 weight percent. This mixture was used as contact media between upper and lower electrodes of a liquid crystal panel having a gap thickness of 10 μm and made of borosilicate glass. The resistance value was 9 KΩ when measured through NESA glass to which the transparent conductive layer was attached. The resistance value remained unchanged after aging.

EXAMPLE 2

Following the procedures of Example 1, glass fiber particles of 7 μm in diameter were electroless plated with a nickel-phosphorus layer 2000 Å thick. Then a layer of the nickel phosphorous 500 Å thick was replaced by gold in an ATOMEX electroless gold plating bath of NIPPON ENGELHARD Ltd. These glass fiber particles with a gold layer 500 Å thick and a nickel-phosphorus layer 1500 Å thick were dispersed in epoxy resin in an amount of 5 weight percent. When using this mixture as the contact media between upper and lower electrodes for a liquid crystal panel, the resistance value was 8 KΩ. This value remained unchanged after performing a fixed aging test. Atomex bath includes 5 g/L potassium gold cyanide and 20 g/L carboxylic acid or carboxylic acid salt.

EXAMPLE 3

Glass fiber particles 7 μm in diameter coated following the procedures of Example 2 were dispersed in ultraviolet curing acrylic-resin in an amount of 15 weight percent. The mixture was used as the contact media between upper and lower electrodes in a liquid crystal panel made of polyethylene film. The resistance value was 7 KΩ, which remained unchanged after the aging test.

EXAMPLE 4

Glass fiber particles 10 μm in diameter coated following the procedures of Example 2 were dispersed in silver paste in an amount of about 2 weight percent. The mixture was used as the contact media between upper and lower electrodes of a liquid crystal panel. The resistance value was smaller than that of the silver paste and remained unchanged after the aging test.

EXAMPLE 5

Following the procedures of Example 4, the glass fiber particles 12 μm in diameter were dispersed in the silver paste in an amount of about 10 weight percent and used as contact media between upper and lower electrodes for the liquid crystal panel. The same results as that of Example 4 were obtained.

EXAMPLE 6

Following the procedure of Example 1, alumina particles 10 μm in diameter were electroless coated with a 3000 Å thickness of nickel-phosphous. Following the procedure of Example 2, a 600 Å thickness of electroless gold plate was formed on the 2400 Å thickness of the nickel-phosphorus layer. These alumina particles having a nickel-phosphorus layer and a gold layer were dispersed in an epoxy resin in an amount of about 10 weight percent. This mixture was used as contact media between upper and lower electrodes. The resistance value was 8 KΩ, which value remained unchanged after the aging test.

EXAMPLE 7

Styrene balls 12 μm in diameter were dipped in a chromic acid mixture for 5 minutes, filtered with a micro filter with pore diameters of 2 μm and rinsed. The styrene balls were dispersed in a mixed solution of 1 g/liter of $SnCl_2$ and 1 cc/liter of HCl, filtered, rinsed and then dispersed in RED SUMER which was prepared according to known processes, filtered and rinsed again. After than, the styrene balls were dispersed for 6 minutes in S-680 solution (45° C.) of JAPAN KANIGEN Co., Ltd., which was prepared according to known steps; filtered and rinsed. A nickel-phosphorus layer 3500 Å thick was formed on the styrene balls. The styrene balls with the nickel-phosphorus layer were dispersed in an epoxy resin in an amount of about 20 weight percent. When using the mixture as contact media between upper and lower electrodes for the liquid crystal panel with a gap thickness of 10 μm, the resistance value at the contact portion of the upper and lower electrodes was 8 KΩ. That value remained unchanged after the fixed aging test.

EXAMPLE 8

Styrene balls coated following the procedures of Example 1, were dispersed in an ultraviolet curing acrylic-resin in an amount of about 10 weight percent. The mixture was used as the contact media between upper and lower electrodes for the same liquid crystal panel as that of Example 1, which had a gap thickness of 10 μm, the resistance value at the contact portion between upper and lower electrodes was 9 KΩ. The value remained unchanged after the fixed again test.

EXAMPLE 9

Nylon balls of 10 μm in diameter were electroless nickle-phosphorus plated to a thickness of 2500 Å following the procedures of Example 1. Next, a portion of the nickel-phosphorus layer 500 Å thick was replaced by gold in an ATOMEX electroless gold plating bath of NIPPON ENGELHARD Ltd. These nylon balls having a gold layer 500 Å thick and a nickel-phosphorus layer 2000 Å thick were dispersed in an epoxy resin in an amount of about 5 weight percent. The mixture was used as the contact media between upper and lower electrodes for a liquid crystal panel having a 10 μm thick gap. The resistance value at the contact portion between the upper and lower electrodes was 6 KΩ. The value remained unchanged after the fixed aging test.

EXAMPLE 10

Following the procedures of Example 3, styrene balls 10 μm in diameter were electroless nickel-plated to a thickness of 2000 Å and electroless gold-plated to a thickness of 600 Å. These styrene balls were dispersed in silver paste. The mixture was used as contact media between upper and lower electrodes for a liquid crystal panel having a gap thickness of 7 μm. The resistance value at the contact portion between upper and lower electrodes was 6 KΩ. The value remained unchanged after the fixed aging test.

EXAMPLE 11

Styrene balls coated following the procedures of Example 4 were dispersed in ultraviolet curing acrylic-resin in an amount of about 10 weight percent. This mixture was used as contact media between upper and lower electrodes for a liquid crystal panel having a gap thickness of 10 μm. The resistance value at the contact portion between the upper and lower electrodes was 8 KΩ. The value remained unchanged after the fixed aging test.

EXAMPLE 12

Substrates of a liquid crystal panel were formed of quartz glass. The contact portion between upper and lower electrodes was masked with resist material after fixed transparent electrodes were patterned on the substrates. Using a sputtering device, a 4000 Å thick layer of $SiO_2$ was formed to insulate the transparent electrodes, except for the contact portion between the upper and lower electrodes. After removing the resist material, the contact media between upper and lower electrodes obtained in the foregoing embodiments 1 to 6 were dispersed in an epoxy resin in an amount of about 15 weight percent. The epoxy materials including the contact media were used as a conductive seal and provided liquid crystal panels of simple construction wherein the contact portions between the upper and lower electrodes were of uniform dimension. Use of this liquid crystal panel decreased the number of process steps in preparing a panel and increased the yields of acceptable panels. Performance characteristics of the liquid crystal panels wherein the contact media doubled as the seal portion were no less than that of the liquid crystal panel wherein the seal portion and the contact portion between the upper and lower electrodes were separated.

When using display panels with contact media between upper and lower electrodes according to the embodiments in FIGS. 1 to 12, the rate of contact failure was reduced to about one-tenth when compared with the contact media of the prior art.

EXAMPLE 13

FIG. 7 shows an embodiment of a liquid crystal display panel according to the invention. Glass panels 100a, 100b are used for the upper and lower substrates and ITO transparent electrodes are used for electrodes 104 and 105 on the upper and lower substrates 100a, 100b. Conductive particles 101 include non-conductive plastic balls 121. The plastic balls 121 are about 5 μm in diameter and electroless plated with a nickel layer 122 of about 0.1 μm thickness. The nickel layer is formed after the surface of the plastic ball 121 is activated as described above. The diameters of the plastic balls were about the same as the thickness $T^1$ of liquid crystal layer 102. A thermoset epoxy adhesive 103 was used as the binder.

In this embodiment, where more than 5 particles 101 are located in contact portion 106, it is preferable to employ about 0.1 to about 50.0 weight percent of conductive particles 101 and about 99.9 to about 50 weight percent binder. If the concentration of the conductive particles 101 is under 5 wt.%, the number of conductive particles 101 in the contact portion 106 of at least about 0.2 mm in diameter becomes less than 5 pieces. This results in unsatisfactory conductive reliability. On the other hand, if the concentration is over 50 weight percent then conductive particles 101 overlap each other and the contact portion 106 will be thicker than the liquid crystal layer 102 and display panel fabrication and reliability will be adversely affected.

Conductive particles 101 were dispersed in the resin 103 prior to hardening to form a mixture which was then coated on the electrode 104 by screen process printing. The two substrates 100a, 100b were then contact-bonded with hardening of binder 103, thereby forming contact portion 106. The thickness of liquid crystal layer 102 was determined by a non-conductive spacer 107 of glass fiber 5 $\mu$m in diameter. The spacers 107 were located in a portion of the liquid crystal layer 102 other than the contact portion 106.

Table 1 shows the result of a reliability test, using a liquid crystal panel including contact media according to the invention. The concentration of the conductive particles is 15 weight percent.

TABLE 1

| Test Condition | FRACTION DEFECTIVE | |
|---|---|---|
| | 60° C.; 90% Relative Hum. 200 Hours | 120° C.; 90% Relative Hum. 200 Hours |
| Embodiment according to this invention | 0/30 pieces | 0/30 pieces |
| Prior art embodiment | 18/30 pieces | 8/30 pieces |

From Table 1, it can be seen that the conductive reliability is remarkably improved in comparison with the prior art. Contact portion 106 was 4.6 to 4.9 $\mu$m thick, which value was almost the same as the average thickness, 4.6 $\mu$m, of the liquid crystal layer 102. When a similar contact portion was formed by conventional methods, its thickness was about 7 $\mu$m, the liquid crystal layer 102 adjacent contact portion 106 became thicker than average, the display speed was not uniform and the color in the display region varied with the light. In the embodiment according to this invention, the liquid crystal layer 102 placed near contact portion 106 is 4.6 to 4.9 $\mu$m thick, so the display speed is uniform and there are no differences in color in the display region.

EXAMPLE 14

FIG. 8 shows another embodiment of a liquid crystal panel according to this invention. Conductive particle 109 comprises glass fiber 123, having a diameter which is almost the same as the thickness of liquid crystal layer 102, a nickel layer 124 of about 0.1 $\mu$m thick on its surface and a gold layer 125 of about 0.1 $\mu$m thickness on the nickel layer. The thickness of the liquid crystal layer 102 was 5 $\mu$m±0.5 $\mu$m. Glass fibers 123 of 5±0.5 $\mu$m diameter and 20 to 100 $\mu$m length were used. Glass fibers 123 having a uniform diameter are made by passing, drawing or extruding melted glass through the orifice of a spinneret type tool having openings of about 5 $\mu$m in diameter, cooling, and then cutting to length of 20 to 100 $\mu$m. This is similar to the method for making filaments of polymer resin, such as nylon, which have uniform diameters. Filaments of polymer resin are formed by melting the thermoplastic polymer resin, passing it through the orifices of a tool having fixed small diameters, and then cooling.

Glass fiber 123 was provided with nickel layer 124 by electroless nickel plating, after activation of its surface. Then, 0.1 $\mu$m thick of gold layer 125 was formed on the nickel layer by electroless gold plating. Binder 103 is an epoxy adhesive. The concentration of conductive particles 109 is preferably between 3 to 30 weight percent and the contention of epoxy is between about 97 to 70 weight percent. In a quality control test 10 weight percent of the plated glass fiber 109 was mixed with 90 weight percent binder 103. Liquid crystal panel was prepared as in Example 13 and the same type of reliability test as in Example 13 was performed. Tests were conducted at 120° C. for 200 hours, and at 60° C. and 90% relative humidity for 200 hours. There were no defective samples in the 30 units tested under these conditions, indicating a high degree of reliability. The thickness of the region defined by contact portion 106 was 4.6 to 4.8 $\mu$m, which was almost the same as the average thickness 4.6 $\mu$m of the liquid crystal layer 102, so that the display speed and the color in the display region were uniform.

As stated above, according to this invention, the conductive reliability at the contact portion of the liquid crystal panel was remarkably improved and the thickness of the liquid crystal layer near the contact portion was made uniform. Therefore, it is now possible to provide a liquid crystal panel having good display quality, wherein the display speed and the color in the display region are uniform. Moreover, the non-conductive core particles, such as glass beads, glass fibers, or plastic balls, can be formed by injection-molding or by cooling after they are melted and passed thorugh an orifice, having a fixed diameter. It is, therefore, possible to mass-produce particles having a uniform diameter. As a result, cell thickness can be made uniform and the cost of manufacture can be reduced.

Having described my invention as related to the embodiments shown in the accompanying drawings, this invention is to be applied not only to the liquid crystal display panel but also to the apparatus having a similar construction.

It is also to be understood that the following claims are intended to cover all of the generic and specific features of the invention herein described and all statements of the scope of the invention which, as a matter of language, might be said to fall therebetween.

What is claimed is:

1. A liquid crystal display panel comprising opposed substrates, electrodes on the inside opposed surfaces of said substrates and arranged opposite to each other to define a liquid crystal display layer including a contact portion with a contact media admixed with a binder disposed between the substrates for maintaining the substrates spaced apart and electrically connecting an electrode on one substrate with an electrode on the other substrate, the dimension of said contact media selected to be substantially the same as the thickness of a liquid crystal cell layer, said contact media containing a non-conductive core particle coated with a first conductive layer formed by electroless plating of the core particle and a second conductive layer comprising a precious metal formed on the first conductive layer.

2. A display panel, as described in claim 1, wherein the non-conductive core is selected from the group consisting of glass fibers, glass beads, and plastic balls.

3. A display panel, as described in claim 1, wherein the non-conductive core is coated by electroless plating of at least one metal selected from the group consisting of gold, silver, tin, copper and nickel.

4. The display panel of claim 3, wherein the second conductive layer is gold.

5. A display panel, as described in claim 1, wherein the non-conductive core is spherical.

6. A display panel, as described in claim 5, wherein the non-conductive particle comprises a plastic ball.

7. A display panel as described in claim 1, wherein the non-conductive core is cylindrical.

8. A display panel, as described in claim 7, wherein the non-conductive core comprises glass fibers having an average diameter of between about 3 and 12 μm and an average length of about 20 to 100 μm.

9. A display panel, as described in claim 1, wherein the contact media and binder comprise from about 0.1 to about 50 weight percent contact media to about 99.9 to about 50 weight percent binder.

10. A display panel, as described in claim 1, wherein the contact portion includes at least about 5 coated particles engaged by the binder.

11. A display panel, as described in claim 1, wherein the liquid crystal cell layer is between about 3 and 12 thick.

12. A display panel, as described in claim 1, wherein the cell thickness is substantially the same as the diameter of the engaged contact media to enable the upper and lower electrodes to be secured in fixed parallel opposition by the contact media.

13. A display panel as described in claim 1, wherein the binder includes a plurality of particles of a conductive metal in a paste.

14. The display panel of claim 1, having two electroless plated conductive layers on the non-conductive core particle.

15. The display panel of claim 14, wherein a first layer of electroless-plated nickel is on the non-conductive core and a second layer of electroless plated gold is disposed on the nickel layer.

* * * * *